(12) United States Patent
Lee et al.

(10) Patent No.: US 8,138,425 B2
(45) Date of Patent: Mar. 20, 2012

(54) PROJECTED CAPACITIVE TOUCH PANEL AND FABRICATING METHOD THEREOF

(75) Inventors: Chi-Chen Lee, Kaohsiung (TW); Fu-Chen Huang, Kaohsiung (TW); Hsin-Min Chen, Kaohsiung (TW); Shih-Min Wu, Kaohsiung (TW)

(73) Assignee: Arima Display Corporation, Kaohsiung (TW)

( * ) Notice: Subject to any disclaimer, the term of this patent is extended or adjusted under 35 U.S.C. 154(b) by 34 days.

(21) Appl. No.: 12/638,230

(22) Filed: Dec. 15, 2009

(65) Prior Publication Data

US 2011/0005818 A1    Jan. 13, 2011

(30) Foreign Application Priority Data

Jul. 7, 2009    (TW) ................ 98122986 A

(51) Int. Cl.
*H05K 1/03*    (2006.01)
(52) U.S. Cl. ....................................... 174/255
(58) Field of Classification Search ............... 29/852; 174/255, 261; 361/777–779, 792–795
See application file for complete search history.

(56) References Cited

U.S. PATENT DOCUMENTS 7,350,298 B2 *  4/2008  Hsu et al. ............ 29/852
\* cited by examiner

*Primary Examiner* — Jeremy Norris
*Assistant Examiner* — Tremesha S Willis
(74) *Attorney, Agent, or Firm* — Volpe and Koenig, P.C.

(57) ABSTRACT

A touch panel and a fabricating method thereof are provided. The touch panel includes: a substrate; a first conductive layer configured on the substrate and having a first and a second portions; an insulating layer covering the first portion; and a second conductive layer having a third portion configured on the second portion, and a fourth portion configured on the insulating layer and being separate from the third portion. The fabricating method includes the steps of: providing a first conductive layer; forming an insulating layer partially covering the first conductive layer; and forming a second conductive layer having a first pattern coupled to the first conductive layer and a second pattern insulated from the first pattern on the insulating layer.

9 Claims, 15 Drawing Sheets

I-I' cross-section

A-A' cross-section

B-B' cross-section

E-E' cross-section

F-F' cross-section

G-G' cross-section

PROJECTED CAPACITIVE TOUCH PANEL AND FABRICATING METHOD THEREOF

FIELD OF THE INVENTION

The present invention relates to a touch panel and a fabricating method thereof, and more particularly to a projected capacitive touch panel and a fabricating method thereof A relevant technical solution is disclosed in the copending application bearing U.S. application Ser. No. 12/559,624 filed on Sep. 15, 2009, the contents of which are incorporated herein for reference.

BACKGROUND OF THE INVENTION

A projected capacitive touch panel is implemented based on a traditional capacitive touch panel and further includes two sets of transparent wires (X and Y) implemented on two different planes and perpendicular to each other and a plurality of driving wires. A conventional projected capacitive touch panel and a fabricating method thereof are described as follow.

Please refer to FIG. 1, which is a flow chart schematically showing the conventional fabricating method for a traditional projected capacitive touch panel. The steps of the conventional fabricating method 100 are illustrated as follow.

(Step 101) A glass substrate is provided.

(Step 102) A first Indium Tin Oxide (ITO) layer is formed/sputtered on the glass substrate. A coating process, an exposing process, a developing process, an etching process, and a stripping process are sequentially proceeded with some sort of photo-resist (A) on the ITO layer so as to form an x-axis pattern layer (including an x-axis channel) acting as a first conductive layer. It is noted that a first photo mask is used in the step.

(Step 103) A coating process, an exposing process, a developing process, an etching process, and a baking process are sequentially proceeded with some sort of photo-resist (B) on the first conductive layer so as to form an insulating layer acting as an insulating film between the x-axis channel and an y-axis channel for insulating the x-axis pattern from an y-axis pattern. It is noted that a second photo mask is used in the step.

(Step 104) A coating process, an exposure process, a development process, an etching process, and a pre-baking process are sequentially proceeded with some sort of photo-resist (A) on the insulating layer. Then a second ITO layer is formed/sputtered thereon and a stripping process is performed to form the y-axis pattern layer (including the y-axis channel) as a second conductive layer. It is noted that a third photo mask is used in the step.

(Step 105) A metal layer is sputtered on the second conductive layer. A coating process, an exposing process, a developing process, an etching process, and a stripping process are sequentially proceeded with some sort of photo-resist (D) on the metal layer so as to form a metal trace layer. It is noted that a fourth photo mask is used in the step.

(Step 106) An Asahiksei Photosensitive Resin (APR) material is printed on the metal trace layer and then solidified with UV light, so as to be transformed into the top-coating (TP) layer. Finally, the above half-finished projected capacitive touch panel is electrically detected and then cut into a finished projected capacitive touch panel.

Please refer to FIG. 2, which is a schematic diagram showing the layers of a traditional projected capacitive touch panel made by the conventional fabricating method of FIG. 1. In FIG. 2, the projected capacitive touch panel 200 includes sequentially a glass substrate 201 as a substrate, an x-axis pattern layer 202 as a first conductive layer, an insulating layer 203 as an insulating film between the crossing point of the x-axis pattern and an y-axis pattern, the y-axis pattern layer 204 as a second conductive layer, a metal layer 205 as a metal trace layer, and a top-coating layer 206.

Please refer to FIGS. 3(a) to 3(i), which are structural and cross-sectional drawings of a traditional projected capacitive touch panel corresponding to the conventional fabricating method of FIG. 1. In FIG. 3(a), an x-axis pattern layer 302 (including an x-axis channel) as a first conductive layer is formed on a glass substrate 301. The x-axis pattern layer 302 has a plurality of rhombic patterns and a plurality of x-axis channels to respectively connecting each of the rhombic patterns. The material of the x-axis pattern layer 302 is ITO. FIG. 3(b) is the cross-sectional drawing of the cross-section A-A'.

In FIG. 3(c), an insulating film 303 as an insulating layer is formed on the x-axis channel of the x-axis pattern layer 302. FIG. 3(d) is the cross-sectional drawing of the cross-section B-B'.

In FIG. 3(e), a y-axis pattern layer 304 (including a y-axis channel) as a second conductive layer is formed on the glass substrate 301 and the insulating film 303. The y-axis pattern layer 304 has a plurality of rhombic patterns and a plurality of y-axis channels to respectively connecting each of the rhombic patterns. The material of the y-axis pattern layer 304 is ITO. It is noted that the insulating film 303 is deposed between the x-axis channel and the y-axis channel for insulating the x-axis pattern layer from the y-axis pattern layer. FIG. 3(f) is the cross-sectional drawing of the cross-section C-C' and FIG. 3(g) is the cross-sectional drawing of the cross-section D-D'.

In FIG. 3(h), the connection of the x-axis pattern layer 302 and metal traces 305 is shown. FIG. 3(i) is the cross-sectional drawing of the cross-section E-E'.

It is noted that the previous Application (application Ser. No. 12/559,624) submitted by the Applicant teaches another method. The method includes providing a substrate, forming a metal trace layer on the substrate, forming a first pattern layer on the metal trace layer, forming an insulation layer on the first pattern layer and forming a second pattern layer on the insulation layer.

The above fabricating method for the traditional projected capacitive touch panel has the following drawbacks:

(1) There are apparent patterns appeared. The color/chromaticity discrepancy between the x-axis pattern layer and the y-axis pattern layer causes the appearance of the apparent rhombic patterns. In the two sputtering process, the difference of the oxygen quantities, the difference of sputtering temperature, the difference of sputtering time and the difference of the consuming of ITO target would cause the chromaticity of the ITO films different after sputtering, because the x-axis pattern layer and the y-axis pattern layer are not formed/sputtered at the same time. It is noted that, due to the thinness of the ITO, the thickness of the ITO films are difficult to control so as to result in the color discrepancy between the x-axis pattern layer and the y-axis pattern layer easily.

(2) The following stripping process may not be performed. It is because the photo-resist suffers from the high sputtering temperature of the second sputtering process and then turns solidified.

(3) The externals (appearance/looks) of the prior art are defective. The reason is that, in consideration of simplifying the process, the bridge point is formed by using the metal traces and it shows shiny spots which can be detected by humans' eye.

Therefore, it would be useful to invent a digital photo frame to circumvent all the above issues. In order to fulfill this need the inventors have proposed an invention "PROJECTED CAPACITIVE TOUCH PANEL AND FABRICATING METHOD THEREOF." The summary of the present invention is described as follows.

SUMMARY OF THE INVENTION

It is therefore an object of the present invention to provide a projected capacitive touch panel and a fabricating method thereof for solving the prior problems.

According to the foregoing object of the present invention, a projected capacitive touch panel is provided. The touch panel includes: a substrate; a first conductive layer configured on the substrate and having a first and a second portions; an insulating layer covering the first portion; and a second conductive layer having a third portion configured on the second portion, and a fourth portion configured on the insulating layer and being separate from the third portion.

Preferably, the touch panel is provided, wherein the substrate further includes a material of a glass, a first and a second surfaces and a protective layer having a material of an Indium Tin Oxide (ITO), the first conductive layer and the protective layer are configured on the first and the second surfaces respectively, and the third portion couples to the second portion.

Preferably, the touch panel is provided, wherein the first conductive layer and the second conductive layer have a material of an ITO and respective film thicknesses being identical to each other.

Preferably, the touch panel is provided, wherein the third portion is a y-axis ITO pattern with two rhombic units, the fourth portion is an x-axis ITO pattern with two rhombic units and an x-axis channel, the first conductive layer is a y-axis channel, the insulating layer is configured between the x-axis channel and the y-axis channel so as to electrically insulate the x-axis pattern from the y-axis pattern, and the touch panel is a projected capacitive touch panel.

According to the foregoing object of the present invention, a conductive structure is also provided. A conductive structure includes: a first conductive layer; an insulating layer partially covering the first conductive layer; and a second conductive layer having a first portion configured on and coupled to the first conductive layer, and a second portion configured on the insulating layer.

Preferably, the conductive structure is provided, wherein the insulating layer has a photo-resist insulating material, the first conductive layer has a covered and an exposed parts, the insulating layer covers the covered part, and the first portion is configured on the exposed part.

Preferably, the conductive structure is provided, wherein the first and the second conductive layers have a material of an ITO, the first and the second portions have respective film thicknesses being identical to each other, and the conductive structure is configured in a projected capacitive touch panel.

Preferably, the conductive structure is provided, wherein the first portion is a y-axis pattern having a first rhombic sub-pattern, the second portion is an x-axis pattern having a second rhombic sub-pattern and an x-axis channel, the first conductive layer is a y-axis channel, and the insulating layer electrically insulates the x-axis and the y-axis channels from each other.

Preferably, the conductive structure further includes a substrate and a metal trace layer, wherein the first conductive layer is configured on the substrate, the metal trace layer has a plurality of metal traces, is configured on the substrate and connects the second conductive layer, and the plurality of metal traces, the first and the second portions have respective thicknesses being identical to one another.

Preferably, the conductive structure further includes a top-coating layer configured on the substrate, the first conductive layer, the insulating layer, the second conductive layer and the metal trace layer and having a material of an Asahiksei Photosensitive Resin (APR).

According to the foregoing object of the present invention, a fabricating method of a conductive structure is provided. The fabricating method includes the steps of: (A) providing a first conductive layer; (B) forming an insulating layer partially covering the first conductive layer; and (C) forming a second conductive layer having a first pattern coupled to the first conductive layer and a second pattern insulated from the first pattern on the insulating layer.

Preferably, the fabricating method further includes a step (A0) of providing a substrate, wherein the first conductive layer is formed on the substrate, and the conductive structure is configured in a projected capacitive touch panel. In addition, the fabricating method further includes the steps of: (D) forming a metal trace layer on the substrate; (E) forming an Asahiksei Photosensitive Resin (APR) layer and solidifying the APR layer with an ultraviolet light to be transformed into a top-coating layer; (F) electrically detecting the projected capacitive touch panel; and (G) cutting the projected capacitive touch panel.

Preferably, the fabricating method is provided, wherein the substrate has an Indium Tin Oxide (ITO) layer thereon processed to form the first conductive layer.

Preferably, the fabricating method is provided, wherein the step (B) further includes the steps of: (B1) filming an Indium Tin Oxide (ITO) layer on the substrate; (B2) coating a photo-resist on the ITO layer; (B3) exposing and developing the photo-resist; and (B4) etching and stripping the ITO layer to be transformed into the first conductive layer.

Preferably, the fabricating method is provided, wherein the step (C) further includes the steps of: (C1) coating an insulating material on the first conductive layer; (C2) exposing and developing the insulating material to form the insulating layer; and (C3) baking the insulating layer to bond thereto the first conductive layer.

Preferably, the fabricating method is provided, wherein the step (D) further includes the steps of: (D1) filming a first Indium Tin Oxide (ITO) layer on the insulating layer; (D2) coating a photo-resist on the first ITO layer; (D3) exposing and developing the photo-resist; and (D4) etching and stripping the first ITO layer to be transformed into the second conductive layer.

Preferably, the fabricating method is provided, wherein the substrate has a first and a second surfaces, the first conductive layer is formed on the first surface, the second conductive layer further has a plurality of metal traces, and the step (D1) further includes a step of (D11) forming a second ITO layer on the second surface.

Preferably, the fabricating method is provided, wherein the first conductive layer is a y-axis channel, the first pattern is a y-axis pattern having at least one rhombic unit, the second pattern is an x-axis pattern having at least one rhombic unit and an x-axis channel, and the insulating layer electrically insulates the x-axis pattern from the y-axis pattern.

By the above touch panel and fabricating method, the yield of the fabricating process could be improved, and the apparent patterns and the defective externals of the prior would also be avoided.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
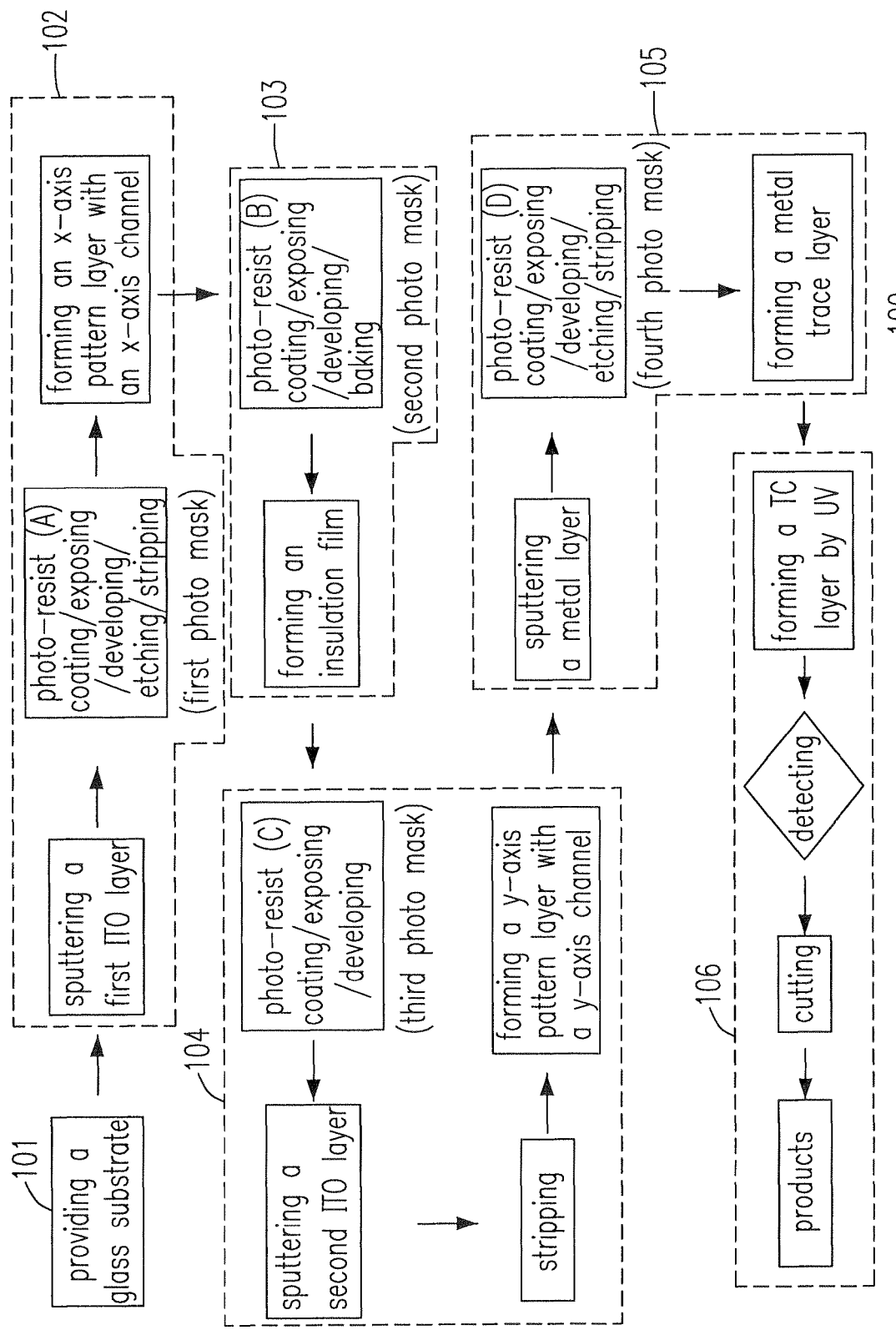
FIG. 1 is a flow chart schematically showing the conventional fabricating method for a traditional projected capacitive touch panel.
Figure 2:
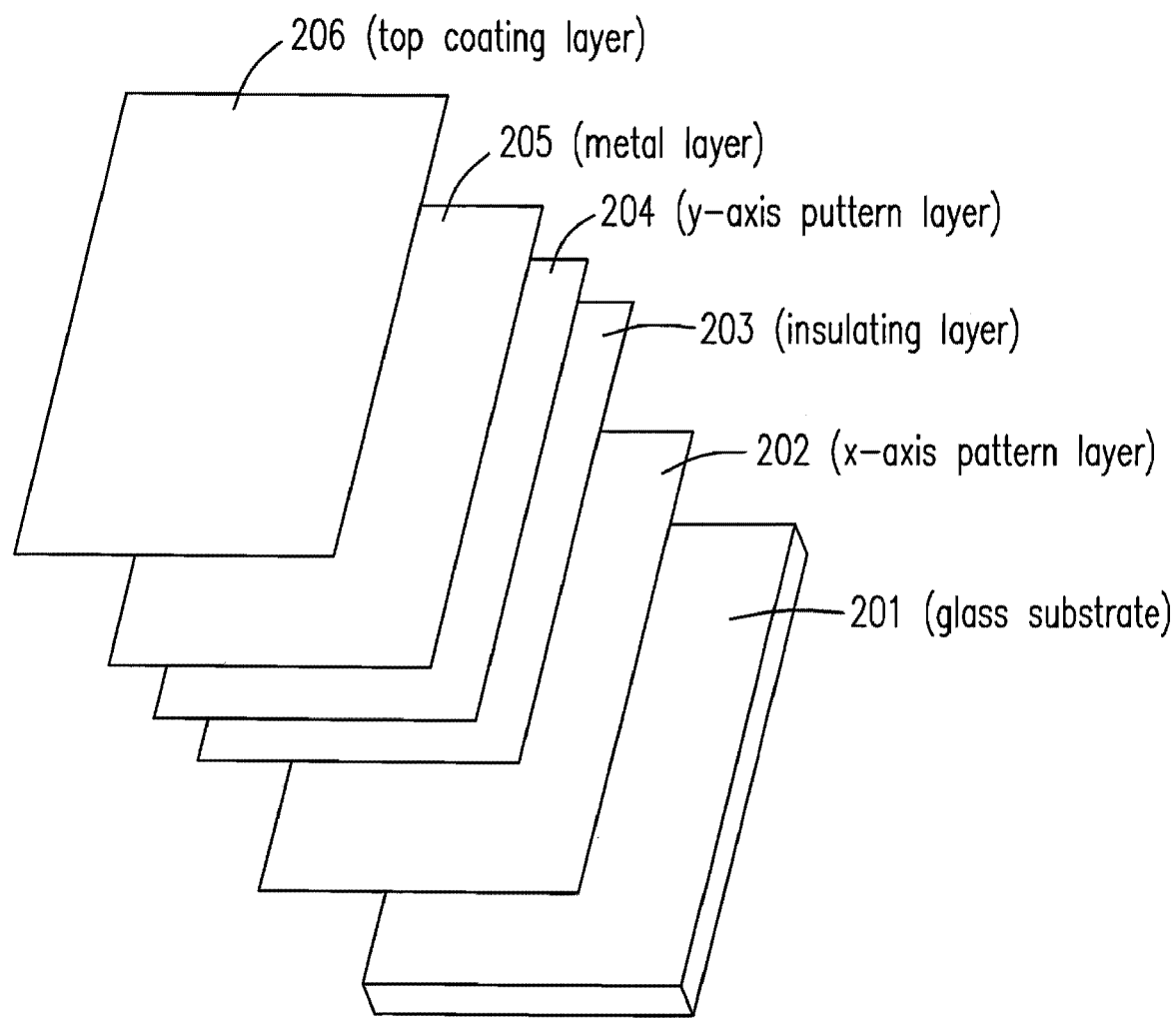
FIG. 2 is a schematic diagram showing the layers of a traditional projected capacitive touch panel made by the conventional fabricating method.
Figure 3A:
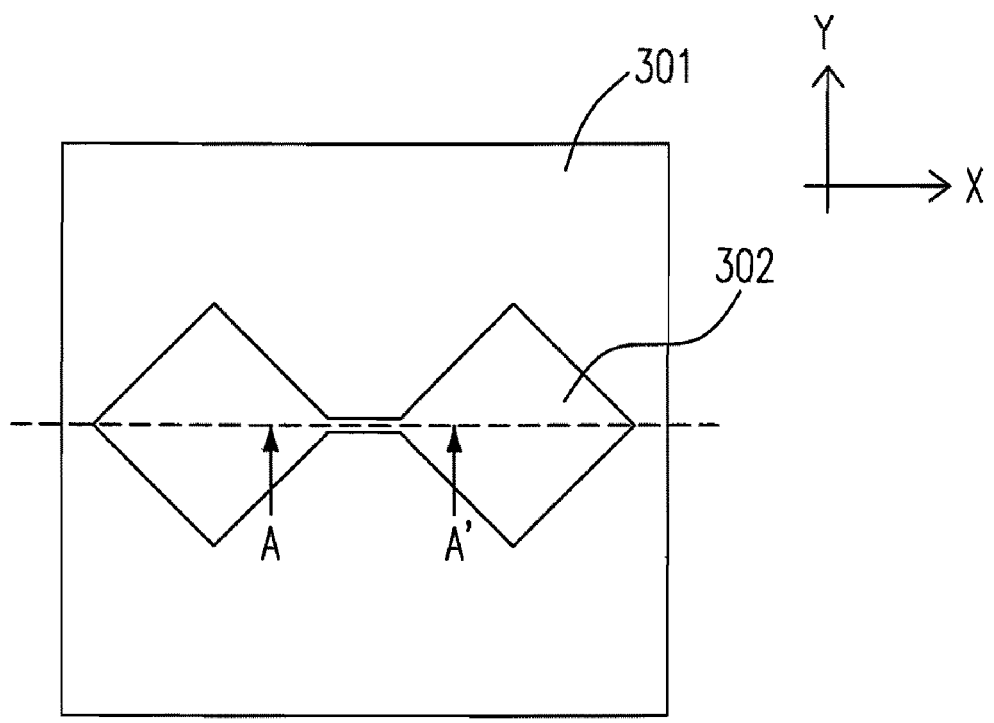
FIGS. 3(a) to 3(i) are structural and cross-sectional drawings of a traditional projected capacitive touch panel corresponding to conventional fabricating method.
Figure 3B:
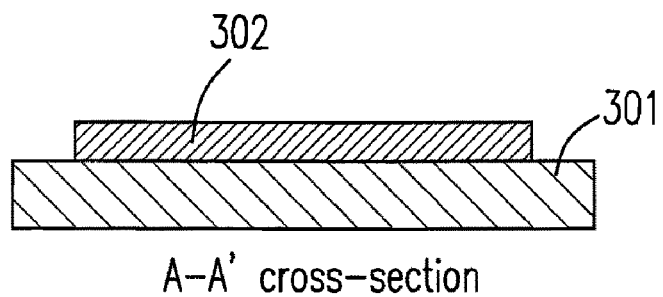
Figure 3C:
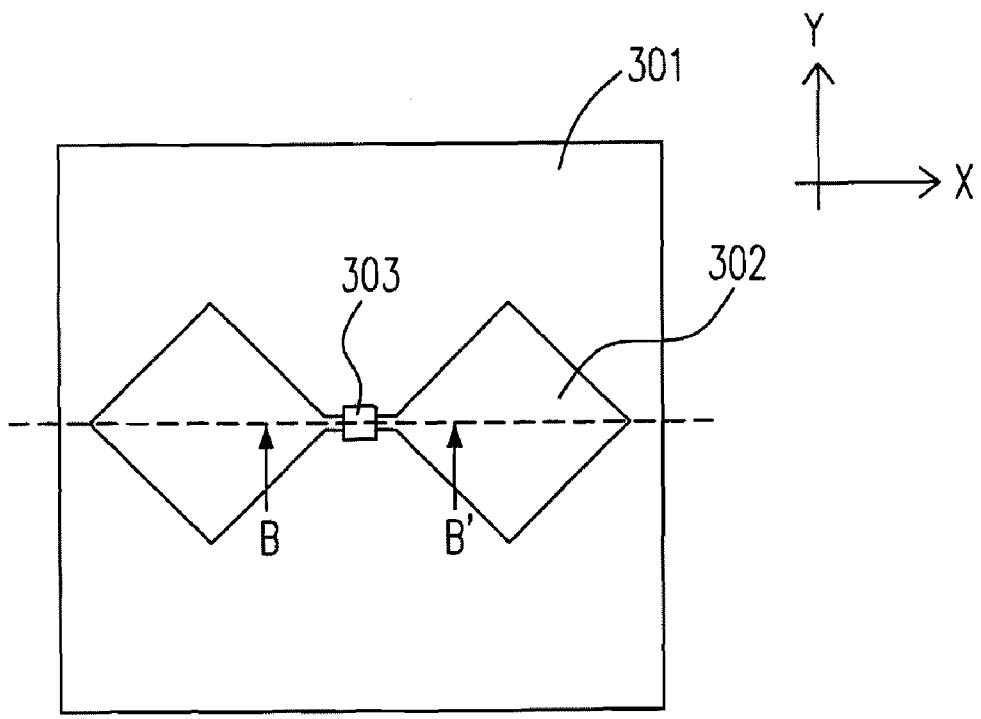
Figure 3D:
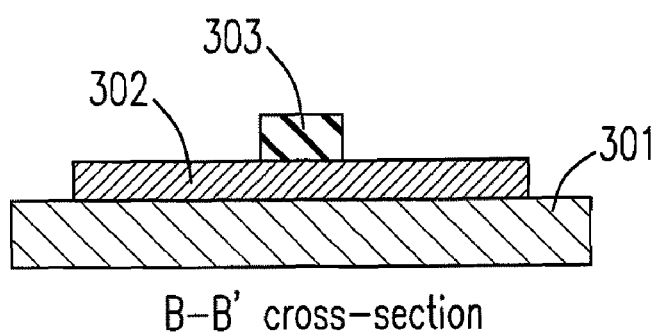
Figure 3E:
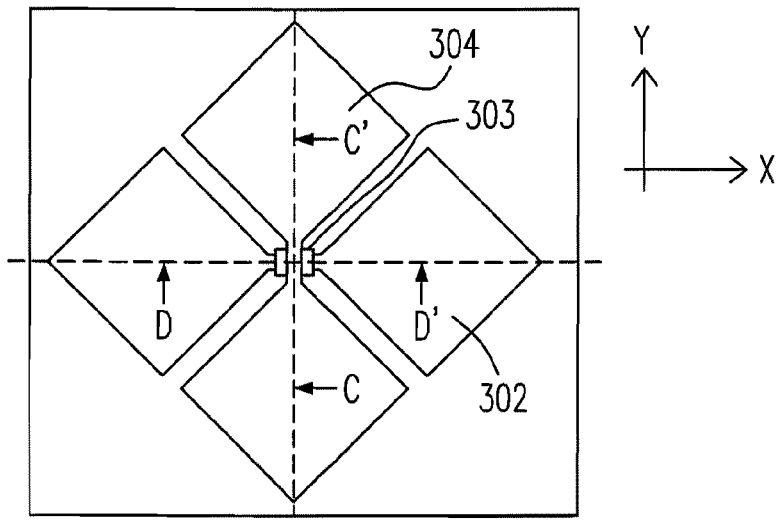
Figure 3F:
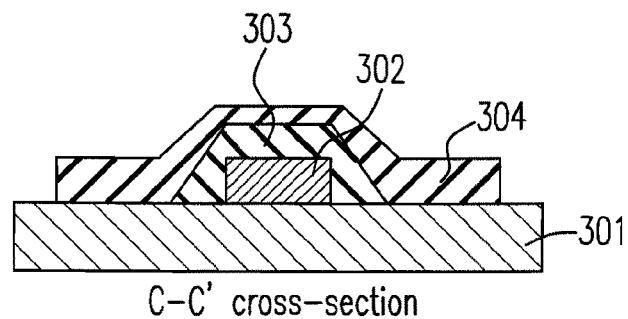
Figure 3G:
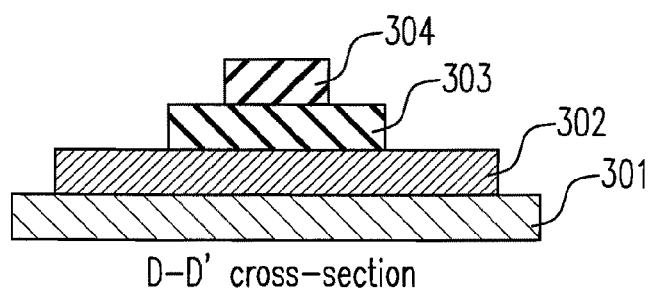
Figure 3H:
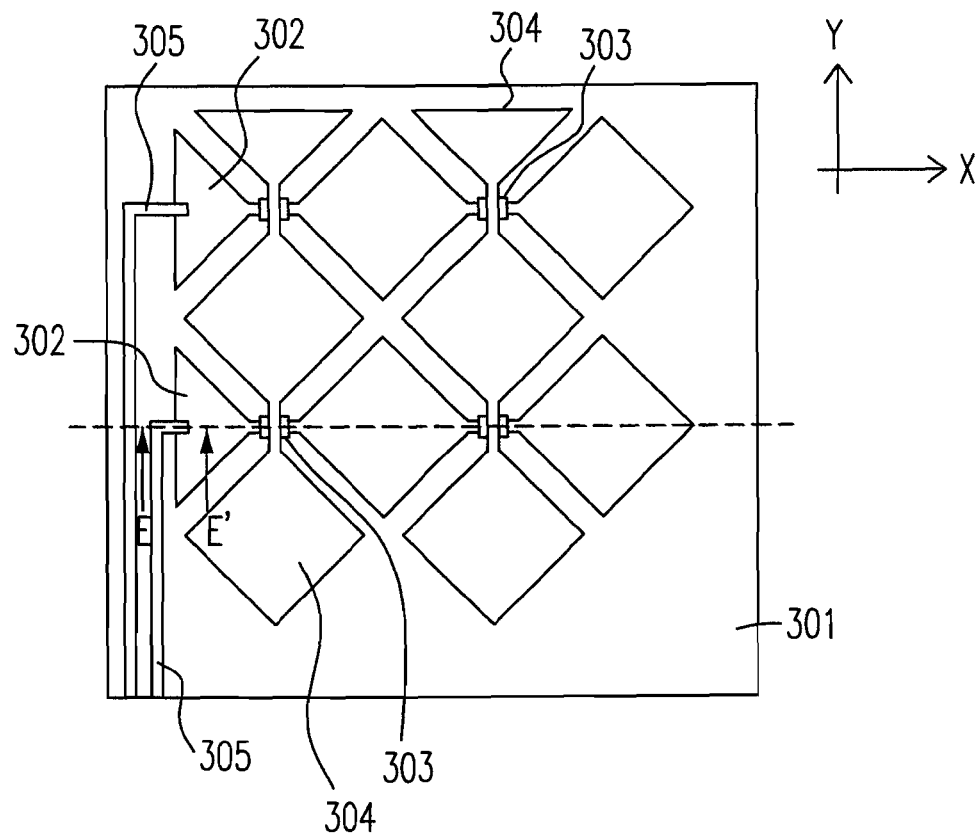
Figure 3I:
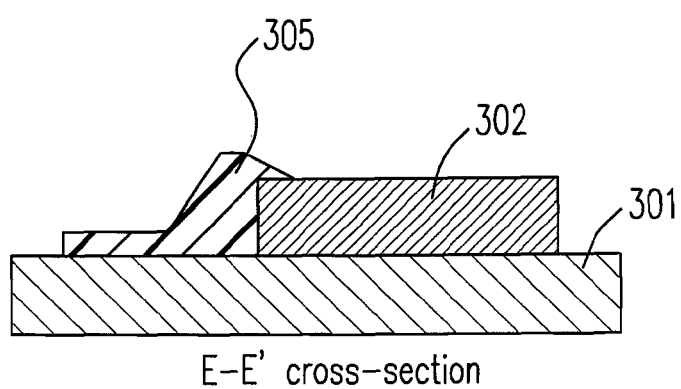
Figure 4:
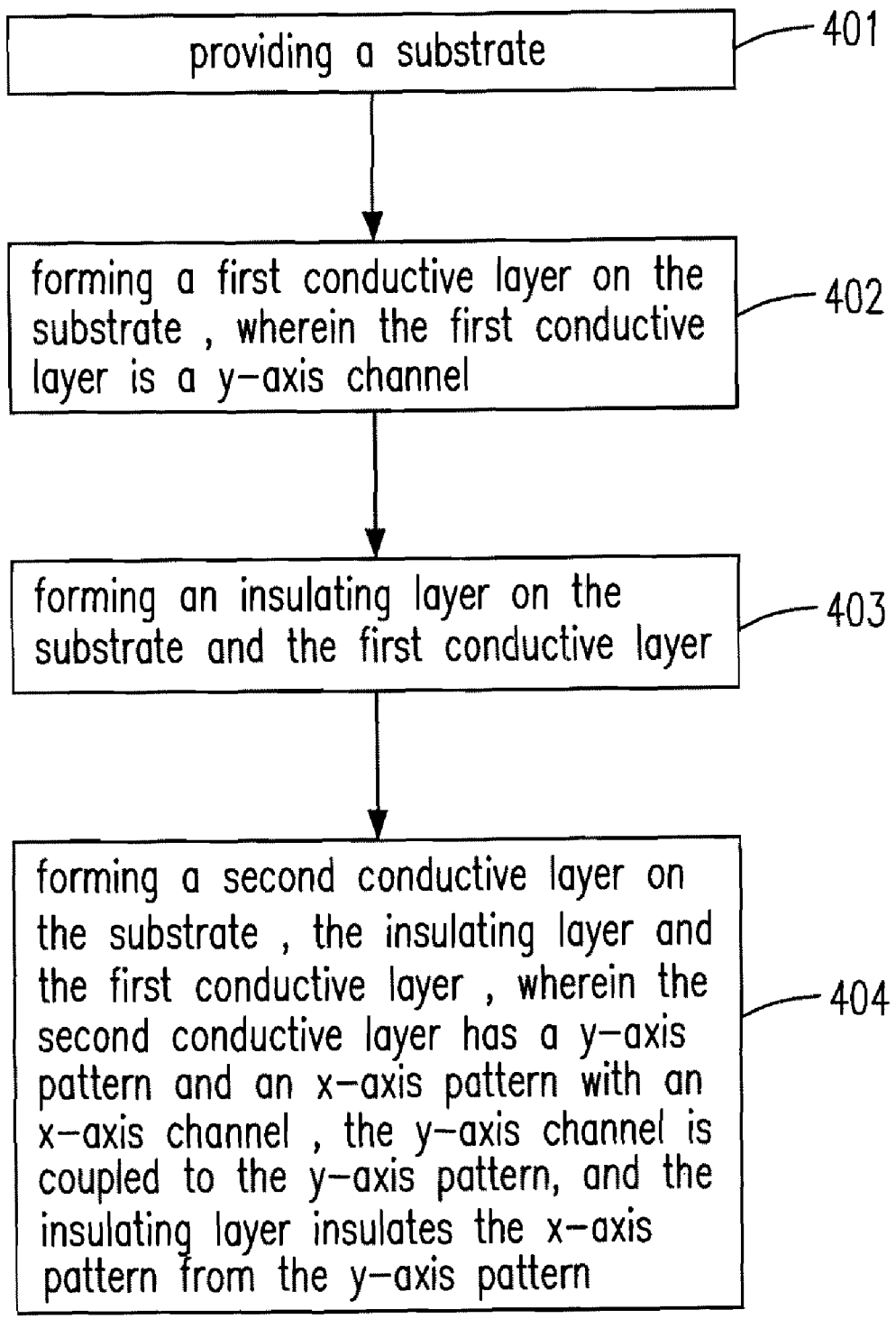
FIG. 4 is a flow chart schematically showing the first preferred fabricating method for a projected capacitive touch panel.

Please refer to FIG. 4, which is a flow chart schematically showing the first preferred fabricating method for a projected capacitive touch panel. The steps of the first preferred fabricating method 400 are illustrated as follow.

(Step 401) A substrate is provided. The substrate can be a glass substrate or other conventional materials known by a skilled person in the art.

(Step 402) A first conductive layer is formed on the substrate. The first conductive layer is a y-axis channel (having a first portion and a second portion) and the material of the layer preferably is ITO or other conventional materials known by a skilled person in the art.

(Step 403) An insulating layer/film is formed on the substrate and the first conductive layer. The insulating layer is partially covered on the first conductive layer (first portion) and the substrate, and the material of the layer preferably is a photo-resist insulating material (which could be etched by micro-etching process) or other conventional insulating materials known by a skilled person in the art. It is noted that the insulating layer preferably covers the first portion.

(Step 404) A second conductive layer is formed on the substrate, the insulating layer and the first conductive layer (the second portion which is uncovered/exposed). The second conductive layer includes a y-axis pattern (a third portion) and an x-axis pattern with an x-axis channel (a fourth portion) and these two patterns are separated (the y-axis pattern is also separated from the x-axis channel).

Furthermore, the first preferred fabricating method could also be used for a conductive structure. Another fabricating method is provided. The method includes providing a first conductive layer, forming an insulating layer partially covering the first conductive layer and forming a second conductive layer having a first pattern coupled to the first conductive layer and a second pattern insulated from the first pattern on the insulating layer.

Figure 5:
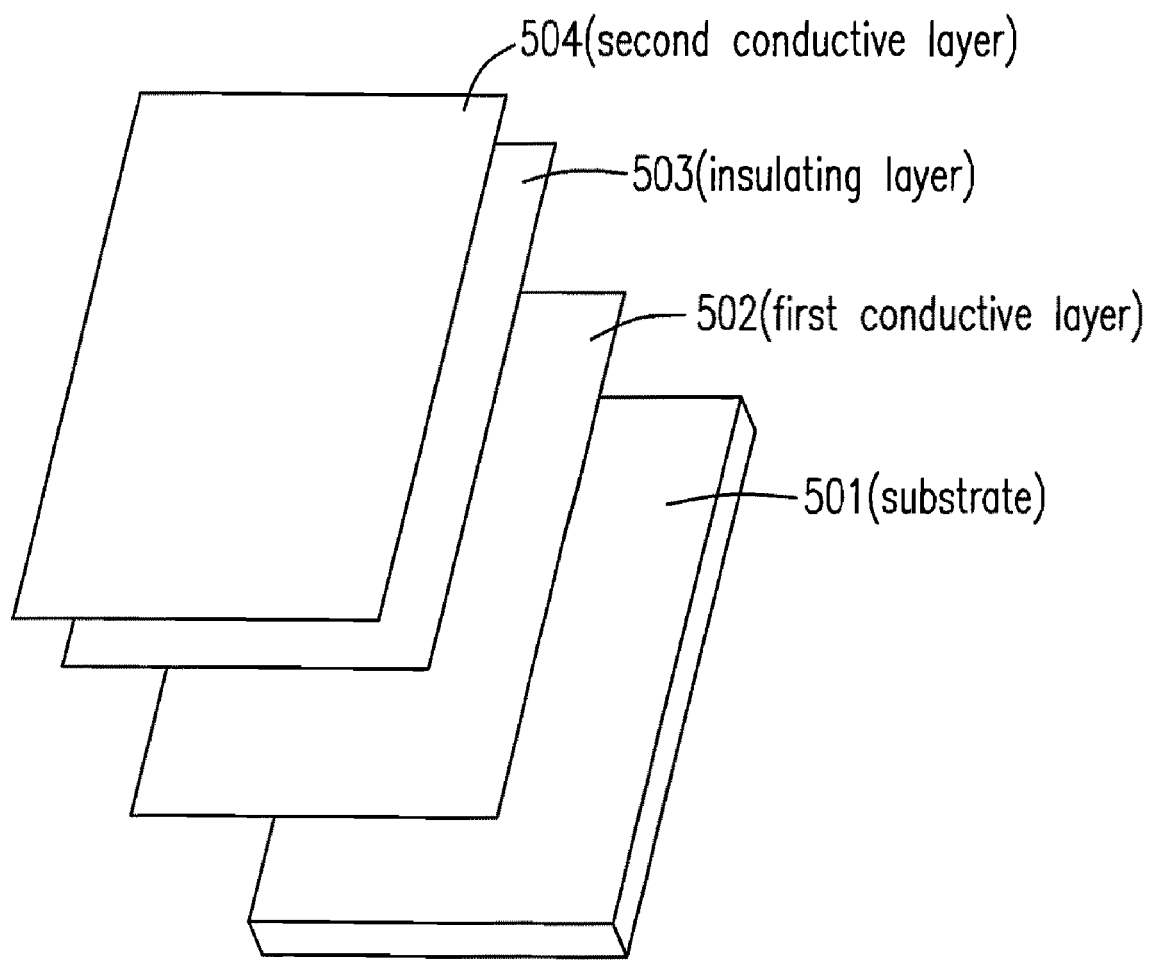
FIG. 5 is a schematic diagram showing the layers of a projected capacitive touch panel made by the first preferred fabricating method.

Please refer to FIG. 5, which is a schematic diagram showing the layers of a projected capacitive touch panel made by the first preferred fabricating method. In FIG. 5, the projected capacitive touch panel 500 includes sequentially a substrate 501, a first conductive layer 502, an insulating layer 503 and a second conductive layer 504.

Figure 6A:
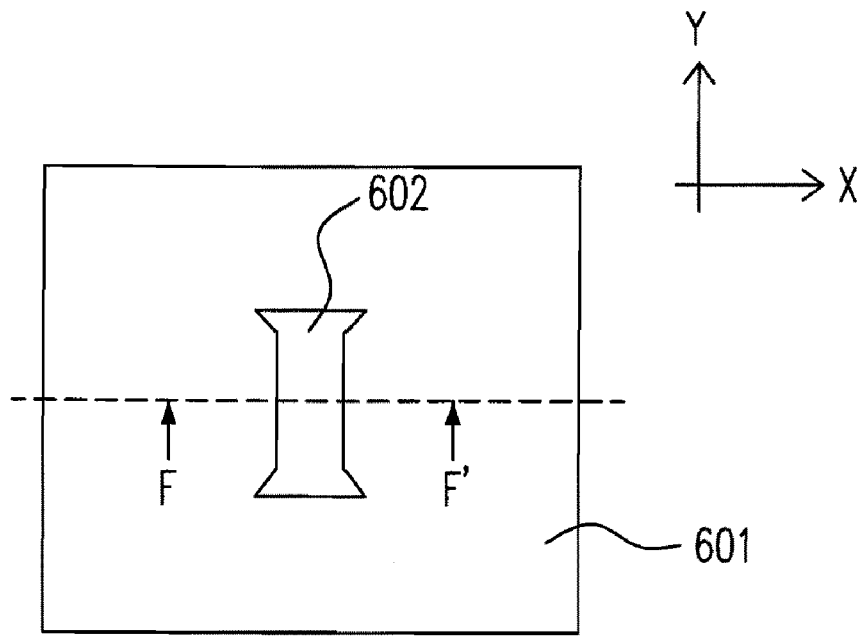
FIGS. 6(a) to 6(h) are schematic diagrams showing the structure and the cross-sections for a projected capacitive touch panel corresponding to the first preferred embodiment.
Figure 6B:
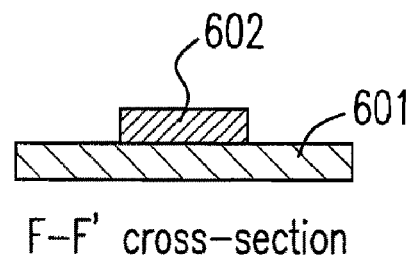

Please refer to FIGS. 6(a) to 6(h), which are schematic diagrams showing the structure and the cross-sections for a projected capacitive touch panel corresponding to the first preferred embodiment shown in FIG. 4. In FIG. 6(a), a first conductive layer 602 is configured/disposed on a substrate 601. The first conductive layer 602 has a y-axis channel and is preferably made of ITO. FIG. 6(b) is the cross-sectional drawing of the cross-section F-F'.

Figure 6C:
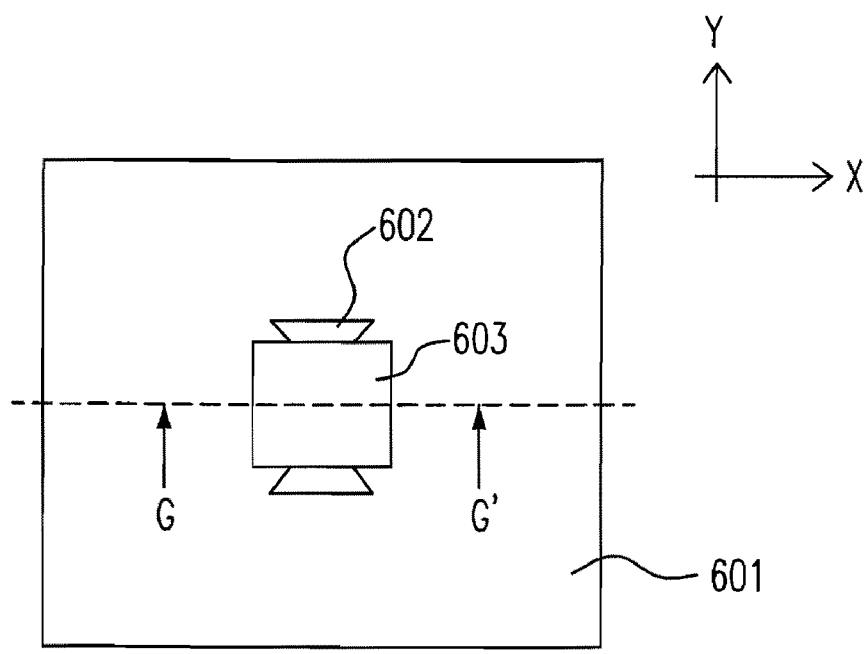
Figure 6D:
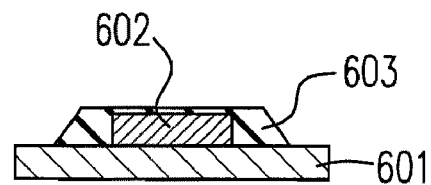

In FIG. 6(c), an insulating layer 603 as is configured/disposed on the first conductive layer 602 and the substrate 601. It is preferred that the insulating layer 603 partially covers the first insulating layer. FIG. 6(d) is the cross-sectional drawing of the cross-section G-G'.

Figure 6E:
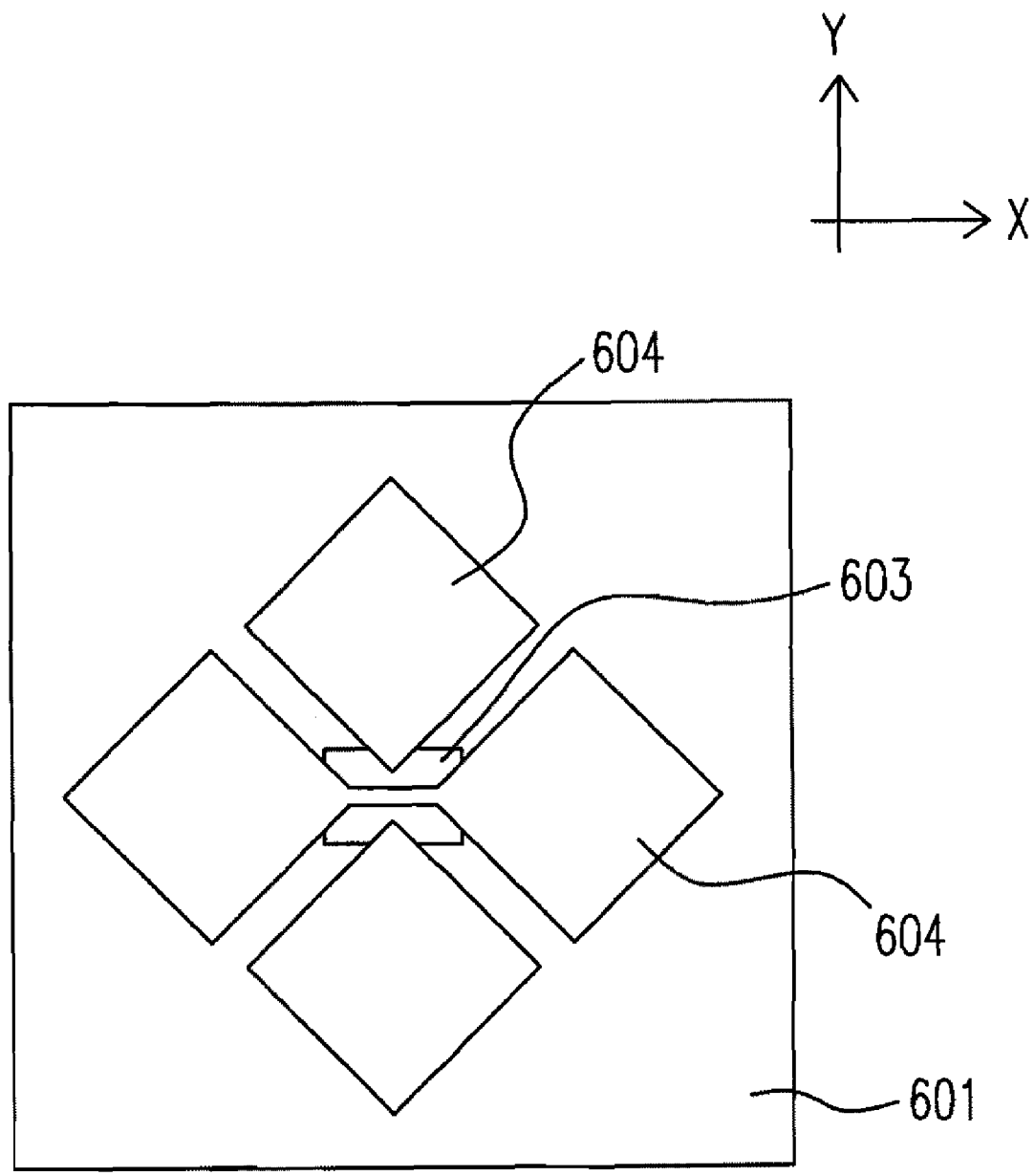
Figure 6F:
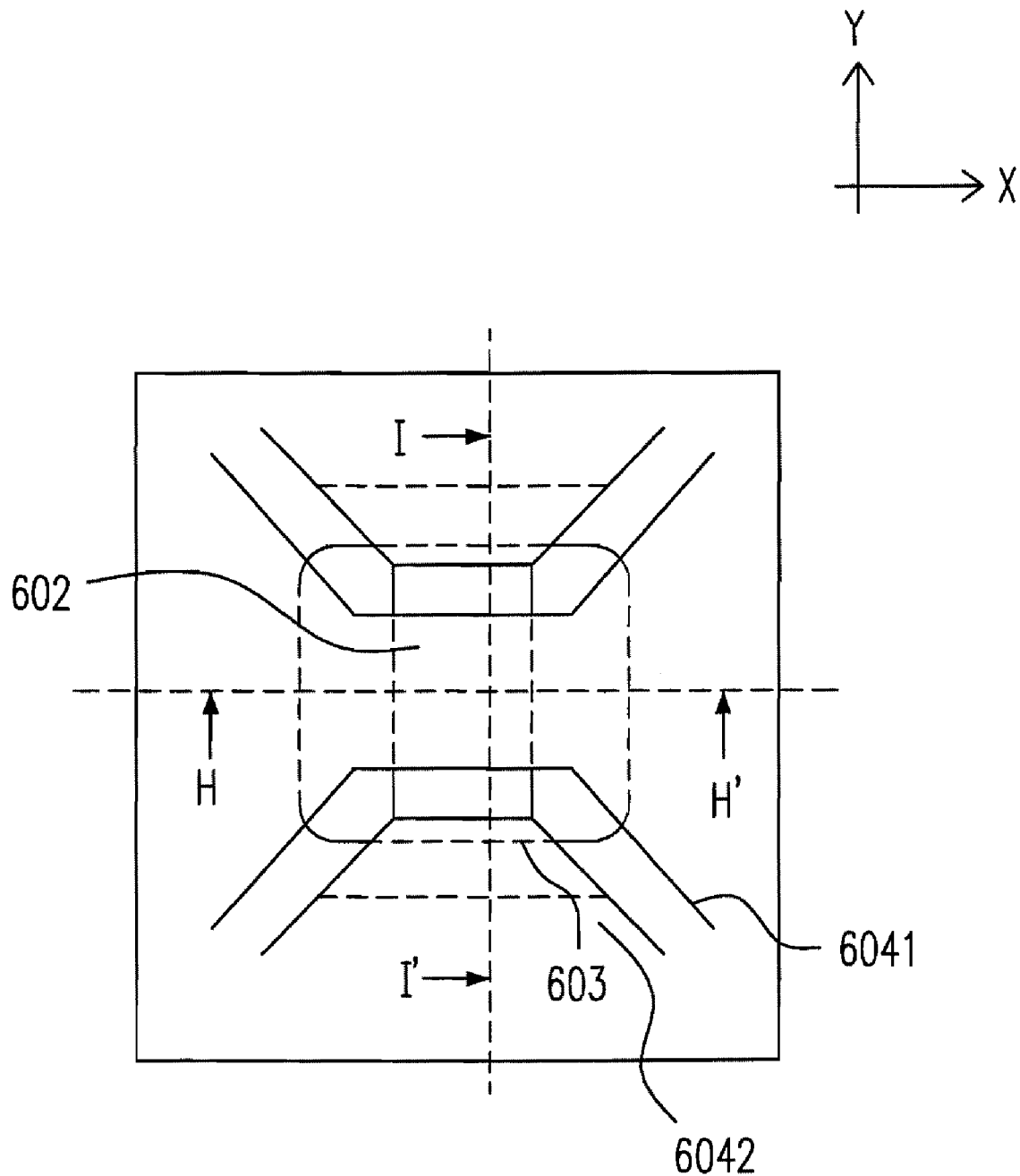
Figure 6G:
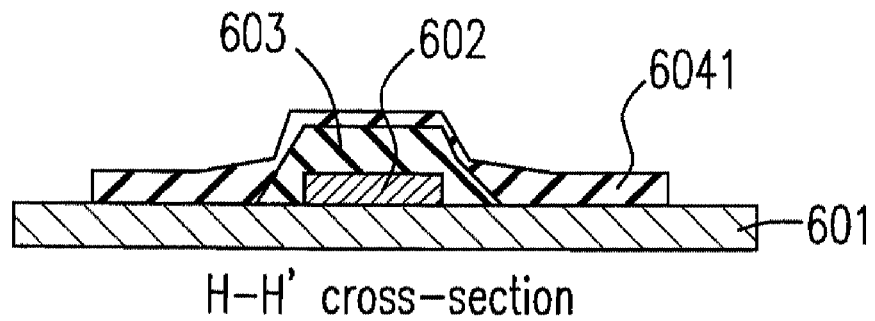
Figure 6H:
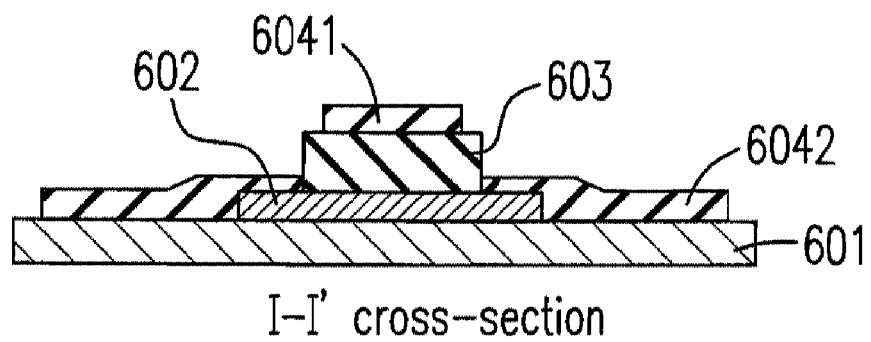

In FIGS. 6(e) and 6(f), a second conductive layer 604 is configured/disposed on the substrate 601, the first conductive layer 602 and the insulating layer 603. The second conductive layer 604 has a first portion 6041 (an x-axis pattern with an x-axis channel) and a second portion 6042 (an y-axis pattern) and is preferably made of ITO. The x-axis and y-axis patterns preferably have rhombic patterns (rhombic units), and the y-axis channel connects the rhombic patterns of the y-axis pattern together. The insulating layer 603 is deposed between the x-axis channel and the y-axis channel for insulating the x-axis pattern from the y-axis pattern. It is noted that FIGS. 6(e) and 6(f) are two different examples for forming the second conductive layer. FIG. 6(g) is the cross-sectional drawing of the cross-section H-H' and FIG. 6(h) is the cross-sectional drawing of the cross-section I-I'. In the viewpoint of FIG. 6(g), the insulating layer 603 covers the first conductive layer 602 and the first portion 6401 covers the insulating layer 603, so that the first conductive layer 602 is insulated from the first portion 6041 of the second conductive layer 604. In the viewpoint of FIG. 6(h), the insulating layer 603 covers the middle portion of the first conductive layer 602 and the uncovered/exposed portion of the first conductive layer 602 connects the second portion 6042 of the second conductive layer 604, so that there would not be a current leakage causing the low sensitivity of the touch panel between the first portion 6401 and second portion 6402. Based on the above-mentioned embodiment and method, one skilled in the art can totally understand and implement the invention. It is noted that the embodiment could function as a conductive structure.

Moreover, the above structure could be applied on any other layers. In other words, such structure is unnecessary to be disposed on a substrate. Therefore, another conductive structure is provided. The structure includes a first conductive layer, an insulating layer and a second conductive layer. The insulating layer partially covers the first conductive layer. The second conductive layer has a first portion configured on and coupled to the first conductive layer, and has a second portion configured on the insulating layer.

Figure 7:
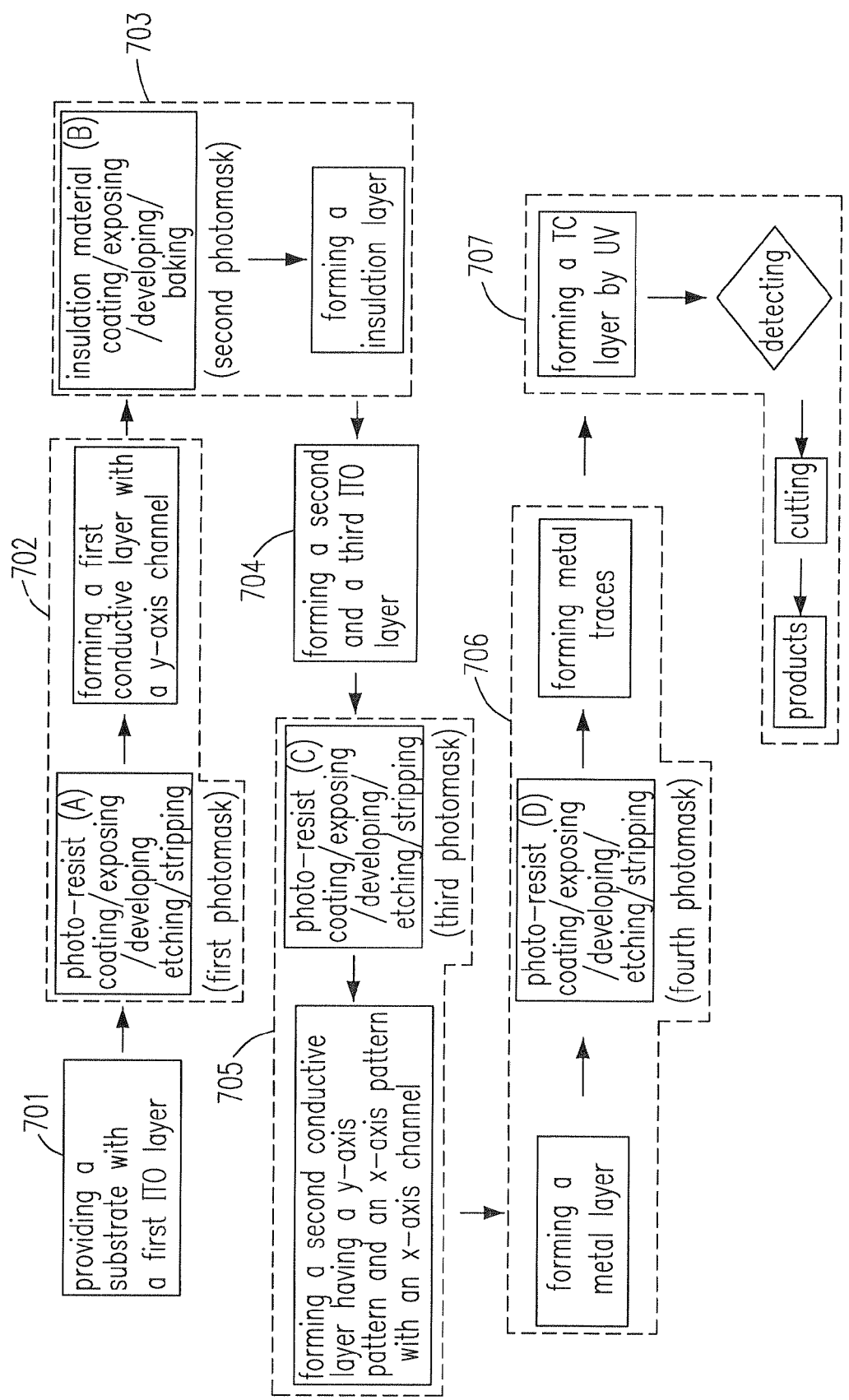
FIG. 7 is a flow chart schematically showing the second preferred fabricating method for a projected capacitive touch panel according to the present invention.

Please refer to FIG. 7, which is a flow chart schematically showing the second preferred fabricating method for a projected capacitive touch panel according to the present invention. The steps of the second preferred fabricating method 700 are illustrated as follow. It is noted that the method could also be used for a conductive structure.

(Step 701) A substrate is provided. The substrate has a first surface with a first ITO layer and a second surface. Preferably, the substrate is a glass substrate.

(Step 702) Some sort of photo-resist (A) is coated on the first ITO layer. A first exposing and developing process on the first photo-resist (A) is performed. Sequentially, a first etching process and a first stripping process are performed to transform the first ITO layer into a first conductive layer having a y-axis channel. It is noted that a first photo mask is used in the step.

(Step 703) Some sort of insulating material (B) is coated on the first conductive layer. A second exposure and development process is performed on the insulating material (B) to form the insulating layer. A baking process is performed to bond the insulating layer to the first conductive layer more closely. It is noted that a second photo mask is used in the step. Preferably, the insulating material (B) is a photo-resist insulating material.

(Step 704) A second ITO layer and a third ITO layer (as a protective layer) respectively on the insulating layer and the second surface by a filming process. It is noted that the second and third ITO layers could be formed/sputtered at the same time or same process. It is reasonable to form/sputter the second ITO layer or the third ITO layer first. Besides, the protective layer could be made of prior materials known by a skilled person in the art.

(Step 705) Some sort of photo-resist (C) is coated on the second ITO layer. A third exposure and development process is performed on the second photo-resist (C). Sequentially, a second etching process and a second stripping process are performed to transform the second ITO layer into the second conductive layer. The second conductive layer has a first pattern and a second pattern. The first pattern has y-axis pattern and the second pattern has an x-axis pattern with an x-axis channel. Preferably, the x-axis and y-axis patterns are in shape of rhombus. The y-axis channel is coupled to the y-axis pattern and the insulating layer electrically insulates the x-axis channel from the y-axis channel, so that the x-axis pattern is insulated from the y-axis pattern. In other words, the first pattern is a y-axis pattern having at least one rhombic unit, the second pattern is an x-axis pattern having at least one rhombic unit and an x-axis channel, and the insulating layer electrically insulates the x-axis pattern from the y-axis pattern. It is noted that a third photo mask is used in the step.

(Step 706) A metal layer is formed/sputtered on the second conductive layer. Some sort of photo-resist (D) is coated on the metal layer.

A fourth exposure and development process is performed on the third photo-resist (D). Sequentially, a third etching process and a third stripping process are performed to transform the metal layer into a metal trace layer having metal traces on the first surface and the metal traces connects the second conductive layer. It is noted that a fourth photo mask is used in the step. Beside, the metal trace layer could be made with the process of the second conductive layer. In other words, the second conductive layer and the metal trace layer could be formed at the same time and with the same material, so that there will be no bridge point causing a defective appearance. It also means that the second conductive layer and the metal trace layer would have respective film thicknesses being identical to each other.

(Step 707) An Asahiksei Photosensitive Resin (APR) layer is formed on the metal trace layer. Then, the APR layer is solidified with ultraviolet light so as to transform the APR layer into a top-coating (TC) layer. The projected capacitive touch panel is electrically detected. Finally, the projected capacitive touch panel is cut into the products.

Figure 8:
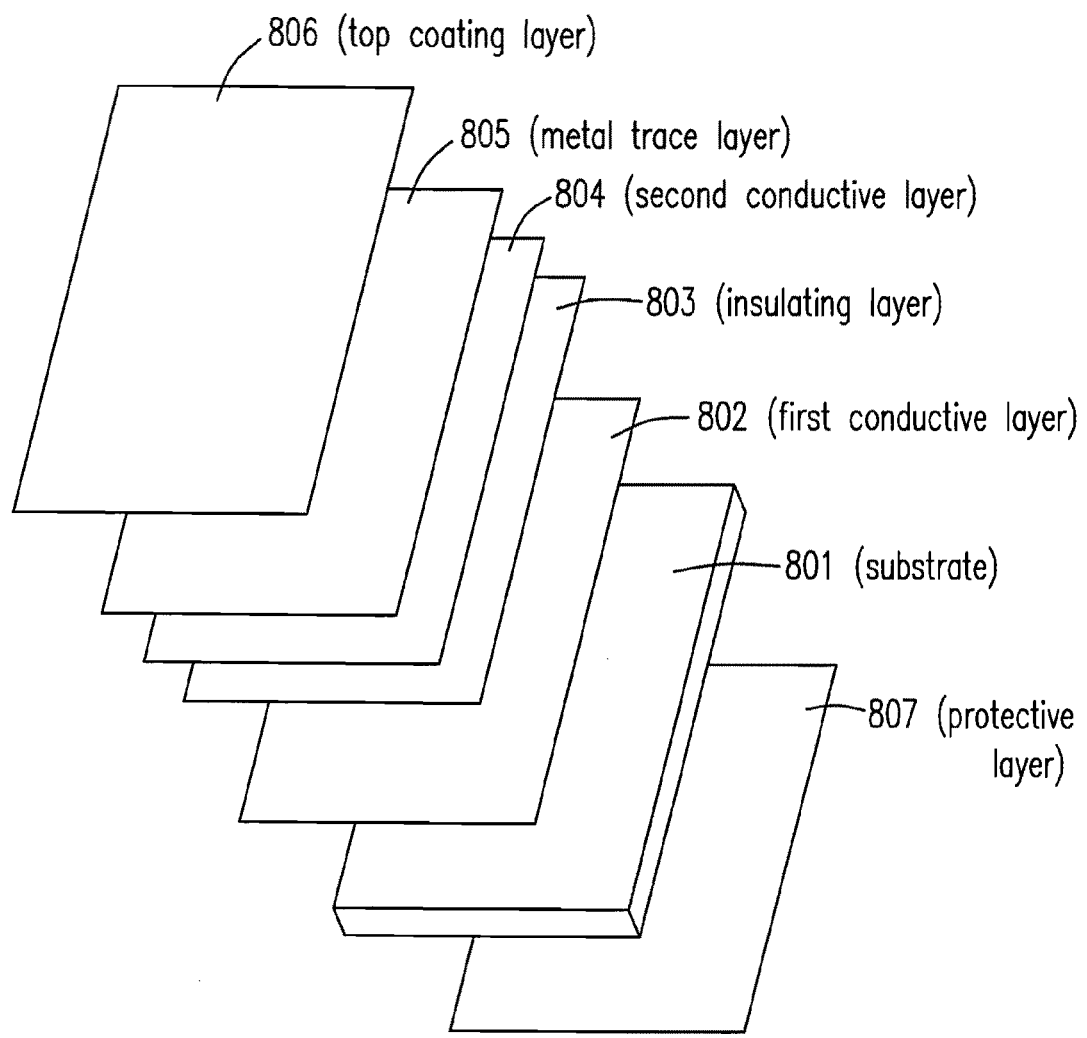
FIG. 8 is a schematic diagram showing the layers of a projected capacitive touch panel made by the second preferred fabricating method.

Please refer to FIG. 8, which is a schematic diagram showing the layers of a projected capacitive touch panel made by the second preferred fabricating method shown in FIG. 7. In FIG. 8, the projected capacitive touch panel 800 includes sequentially a substrate 801, a first conductive layer 802 (on the first surface of the substrate 801), an insulating layer 803, a second conductive layer 804, a metal trace layer 805 and a top coating layer 806. It is noted that a protective layer 807 is on the second surface of the substrate 801.

In sum, the projected capacitive touch panel and a fabricating method thereof is provided in the present invention. Since the x-axis pattern and the y-axis pattern are formed/sputtered at the same time or at one process (not separately formed but together), the color/chromaticity of the x-axis pattern is consistent with that of the y-axis pattern so as to result in that no apparent patterns appear. Besides, it could avoid the second ITO forming process (which causes the photo-resist to turn solidified) by using a substrate with an ITO layer so as to facilitate the stripping process. Furthermore, there is only one three-layer structure (the superposed section of the y-axis channel, the insulating layer and the x-axis channel), and the others are one-layer structure. Therefore, the barrier for light could be reduced so as to promote the light transmissivity of the surface of the projected capacitive touch panel. In order to prevent the short between the x-axis pattern and y-axis pattern, it is preferred to use a photo-resist insulating material (which could be etched via micro-etching process) to form the insulating layer. Thus, the area of the insulating layer could be smaller and the position thereof could be more precise, so that the transmissivity of the touch panel increases. Based on the above reasons, the yield of the fabricating process could be improved greatly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A fabricating method of a conductive structure, comprising the steps of:
   (A) providing a first conductive layer having a y-axis channel;
   (B) forming an insulating layer partially covering the y-axis channel; and
   (C) forming a second conductive layer having a y-axis pattern and an x-axis pattern, wherein the y-axis pattern has at least two portions isolated from each other, the x-axis pattern has at least two portions and an x-axis channel connecting the at least two portions of the x-axis pattern, the at least two portions of the y-axis pattern are coupled to each other by the y-axis channel of the first conductive layer, and the x-axis pattern and the x-axis channel are insulated from the y-axis pattern and the y-axis channel by the insulating layer.

2. The fabricating method as claimed in claim 1 further comprising a step (A0) of providing a substrate, wherein the first conductive layer is formed on the substrate, and the conductive structure is configured in a projected capacitive touch panel.

3. The fabricating method as claimed in claim 2 further comprising the steps of:

(D) forming a metal trace layer on the substrate;
(E) forming an Asahiksei Photosensitive Resin (APR) layer and solidifying the APR layer with an ultraviolet light to be transformed into a top-coating layer;
(F) electrically detecting the projected capacitive touch panel; and
(G) cutting the projected capacitive touch panel.

4. The fabricating method as claimed in claim 2, wherein the substrate has an Indium Tin Oxide (ITO) layer thereon processed to form the first conductive layer.

5. The fabricating method as claimed in claim 2, wherein the step (A) further comprises the steps of:

(A1) filming an Indium Tin Oxide (ITO) layer on the substrate;
(A2) coating a photo-resist on the ITO layer;
(A3) exposing and developing the photo-resist; and
(A4) etching and stripping the ITO layer to be transformed into the first conductive layer.

6. The fabricating method as claimed in claim 2, wherein the step (B) further comprises the steps of:

(B1) coating an insulating material on the first conductive layer;
(B2) exposing and developing the insulating material to form the insulating layer; and
(B3) baking the insulating layer to bond thereto the first conductive layer.

7. The fabricating method as claimed in claim 2, wherein the step (C) further comprises the steps of:

(C1) filming a first Indium Tin Oxide (ITO) layer on the insulating layer;
(C2) coating a photo-resist on the first ITO layer;
(C3) exposing and developing the photo-resist; and
(C4) etching and stripping the first ITO layer to be transformed into the second conductive layer.

8. The fabricating method as claimed in claim 7, wherein the substrate has a first and a second surfaces, the first conductive layer is formed on the first surface, the second conductive layer further has a plurality of metal traces, and the step (C1) further comprises a step of (C11) forming a second ITO layer on the second surface.

9. The fabricating method as claimed in claim 2, wherein the at least two portions of the y-axis pattern are rhombic units, and the at least two portions of the x-axis pattern are rhombic units.

* * * * *